United States Patent Office 2,752,221
Patented June 26, 1956

2,752,221

CORROSION INHIBITION

Aaron Wachter, Oakland, and Nathan Stillman, Berkeley, Calif., assignors to Shell Development Company, Emeryville, Calif., a corporation of Delaware No Drawing. Application October 20, 1950, Serial No. 191,330

11 Claims. (Cl. 21—2.5)

The present invention relates to corrosion inhibition. More specifically, it relates to vapor-phase corrosion inhibition and to improved methods and compositions for use in protecting metals from corrosion, especially corrosion due to contact by water vapor and oxygen, e. g., as in humid air.

It has been discovered previously that certain compounds, or groups thereof, will effectively protect metal surfaces from atmospheric corrosion merely by virtue of the presence of the vapors from such compounds in the atmosphere contacting the metal. One of these groups of compounds, viz., the water-soluble organic nitrogen base nitrites, was disclosed in our earlier application Serial No. 557,358, filed October 5, 1944, now abandoned. The present invention is particularly directed to improvements in compositions containing these nitrite compounds.

It has now been found that outstandingly effective vapor-phase corrosion inhibition may be achieved by an atmosphere containing the vapors of a composition containing both a basic-acting agent and a water-soluble organic nitrogen base nitrite.

As was pointed out in the afore-mentioned application Serial No. 557,358, the atmosphere containing the water-soluble nitrite compound may be obtained in various ways, as, for example, by providing a quantity of a volatile compound having a nitrite anion; or by continuously and slowly reacting material which will yield a compound having a nitrite anion; or by providing volatile compounds, the vapors of which will react to form a compound having a nitrite anion; or by any other suitable means whereby the nitrite radical, —O—N=O, is maintained as a part of the atmosphere surrounding the metal surfaces.

In many situations, it is difficult to conclusively ascertain which, if any, of the above mechanisms are involved, and it is believed that more than one may frequently be involved simultaneously. Consequently, it is to be understood that the present invention should not be limited by any of the theoretical explanations which may be hypothesized herein, such explanation being proposed only in an attempt to impart a better understanding of the invention.

In a preferred embodiment of the invention, the improved compositions are made up of a basic-acting agent and an organic nitrogen base salt of nitrous acid. The organic bases which will form such nitrite salts will usually be amines. Examples of the nitrogenous bases are primary amines, such as isopropylamine, cyclohexylamine, benzylamine, allylamine, etc.; secondary amines, such as diethyl or diisopropylamine, dicyclohexylamine, piperidine, morpholine, various thiazolines and the like; tertiary amines, such as trimethylamine, triisopropylamine, and higher homologues thereof, N-methyl piperidine, and various other alicyclic, aralkyl, alkaryl, aryl, etc., tertiary amines; quanternary ammonium bases, such as tetramethylammonium hydroxide, trimethylbenzylammonium hydroxide, and N-hydrocarbon pyridinium or quinolinium quanternary ammonium hydroxides having alkyl, cycloalkyl, or aralkyl groups on the quanternary nitrogen atom.

It will be readily apparent that the important characteristic of the organic base portion of the above organic nitrogen base nitrite salts is that said base have sufficient basicity to form a salt of nitrous acid.

It is believed that the above organic nitrogen base nitrite salts are effective by virtue of volatilization of the salt itself, although it is conceivable, particularly in the case of the relatively high molecular weight salts, that the moisture in the air causes the salts to hydrolyze and give off nitrous acid vapors, which vapors being of a water-soluble compound containing a nitrite anion, could be the efficient cause of the corrosion inhibition.

Other means of supplying an atmosphere with a water-soluble organic nitrogen base nitrite will be readily apparent to a skilled chemist. In each case, the presence of such nitrite compounds in the atmosphere may be readily detected and measured by well-known methods such as absorption in sodium carbonate solution and analysis by a colorimetric method or by titration with standard permanganate solution.

The basic-acting agent, which, together with the source of water-soluble organic nitrogen base nitrite, makes up the compositions of this invention, may be any compound which has a pH value in excess of about 7 when dispersed in water, or which reacts as a base in the presence of acid-acting materials (and thereby removes acidic properties of the latter).

As stated, the basic agent may be an organic or an inorganic compound. It may be a primary, secondary, or tertiary amine, a quaternary ammonium base, one of the other onium bases, e. g., sulfonium, or a mixture comprising two or more of these substances. Also, it is practical to use an amine, the hydrocarbon radicals of which are different, or an amine containing a plurality of amino groups. The compound employed as a stabilizing agent according to the process of this invention may contain an acyclic, alicyclic or heterocyclic structure. In any case, one or more of the hydrogen atoms of the basic nitrogen atom may be substituted with other hydrocarbon radicals which may be heterocyclic, aromatic, acyclic or alicyclic radicals. The basic nitrogen atom may be part of a heterocyclic ring. The substituents on the basic nitrogen atom may have aliphatic unsaturations or aromatic unsaturations, or both. The organic substituents on the basic nitrogen atom may contain stable polar radicals, such as, e. g. chloro, fluoro, bromo, ether, thioether, alcohol, free amino, ketone, ester, nitrite, cyanate, nitrile, or nitro groups. In the structures of the above organic bases a basic sulfur atom, particularly in the onium form, is suitable as the source of the basicity in the organic structure in place of nitrogen atom. Examples of amines which may be used as the basic-acting substance are:

(1) *Primary amines.*—Isopropylamine, 2-amino-butane, methylamine, propylamine, ethanolamine, 2-amino-4-methyl-pentane, various amyl, hexyl, heptyl, octyl, and higher homologous primary amines, e. g., stearylamine, laurylamine, etc.; cyclopentylamine, alkylated cyclopentylamines, cyclohexylamine, alkylated cyclohexylamines, bornylamine, fenchylamine, cycloterpenylamines, pinylamine, benzylamine, beta-phenylethylamine, alkylated benzylamines, tetrahydro-beta-naphthylamine, allylamine, beta-methylallylamine, beta-chloroallylamine, tertiary-butylamine, and their homologs or analogs.

(2) *Secondary amines.*—Dimethyl, diethyl, di-n-propyl, diisopropyl, dibutylamines, diethanolamine, secondary amines derived from amyl, hexyl, heptyl, octyl, and higher homologous alkyl groups such as di-n-laurylamine; methylisobutylamine, N-methyl-N-tertiary-butylamine, N-alkyl-N-cyclohexylamine, N-alkyl-N-bornylamine, dibornylamine, N-methyl-N-cycloterpenylamine, N-isopropyl-N-methylamine, N-alkyl-N-benzylamines, and their homologs or analogs; dicyclopentylamine, dicyclohexylamine, alkylated dicyclohexylamines; diphenylamine, dibenzylamine, di-(beta-phenylethyl)-amine; piperidine, piperazine, alkylated piperidines or piperazines; pyrrolidines, 1,4-alkylated and un-alkylated oxazines, such as morpholine, alkylated 1,3-oxazines, such as 2,4,4,6-tetramethyl tetrahydro-3 oxazine, and alkylated 1,3-thiazolines, such as 2,4,4,6-tetramethyl tetrahydro-3-thiazoline.

(3) Secondary amine type derivatives of alkylene diamines having the general structural formula:

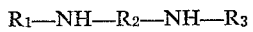

wherein $R_1$ and $R_3$ may be like or different aliphatic, alicyclic, aralkyl, alkarylalkyl, heterocyclic, or terpenic radicals, and wherein $R_2$ is an alkylene radical. These $R_1$ and $R_3$ radicals, for instance, may be isopropyl, butyl, cyclohexyl, benzyl, and/or bornyl radicals. The $R_2$ radical is preferably an ethylene, or propylene radical.

(4) *Tertiary amines.*—Trimethylamine, triethylamine, triethanolamine, tri-n-propylamine, triisopropylamine, tributylamine, higher homologous and isomeric trialkylamines, various N-substituted tertiary amines having different organic radicals on the amino nitrogen atom, e. g., alkyl, cycloalkyl, alicyclic, bornyl, fenchyl, aralkyl, and their homologs and analogs; and tertiary amine-type derivatives of alkylene diamines.

(5) *Quaternary ammonium bases.*—Tetramethyl and higher tetra-alkylammonium bases; trimethylbenzyl, trimethylcyclohexyl, tributyldecylammonium bases; various quaternary N-substituted ammonium bases having various organic radicals (of the type described above) on the quaternary nitrogen atom; pyridinium and alkylated pyridinium of quinolinium quaternary ammonium bases having an alkyl, cycloalkyl, or aralkyl group on the quaternary nitrogen atom, including methyl, butyl, cyclohexyl, benzyl groups and their homologs or analogs.

Examples of other types of organic nitrogenous bases which are suitable as alkaline agents include: guanidine, N-alkylated guanidines, acetamidine, urea, isopropyl urea, alkylated ureas, alkaloids such as nicotine, caffeine, etc. As is evident from the above, either acyclic, cyclic, or N-heterocyclic organic bases are efficacious for use in this invention.

The alkaline agent for the vapor-phase inhibitors may also be an organic base salt of a weak acid. In this case, the organic base constituent of the salt is suitably any one of the organic bases specified herein. Examples of suitable organic nitrogenous base salts of weak acids include carbonate and/or bicarbonate salts of any one or more of the above amines or nitrogenous bases. Some of the preferred salts are the bicarbonates or carbonates of diisopropylamine, dicyclohexylamine, N-cyclohexyl-3,3,5-trimethylcyclohexylamine, di-n-amylamine, di-secondary-butylamine, cyclopentylamine, cyclohexylamine, morpholine and guanidine.

As a basic-acting agent, it is possible to use the nitrosoamine derivatives of any of the above organic acyclic, cyclic, or N-heterocyclic amines, or basic nitrogen compound specified herein. Diisopropyl nitrosoamine, e. g., has been found to increase materially the stability of diisopropylammonium nitrite.

Suitable inorganic alkaline agents of the present invention may be inorganic salts which hydrolyze in water to give an alkaline reaction to litmus, preferably salts of alkali or alkaline earth metals and a weak acid, e. g., sodium bicarbonate, sodium carbonate, calcium bicarbonate, disodium phosphate, trisodium phosphate or potassium nitrite. Sodium chromate is sufficiently alkaline in reaction to be effective. Suitable hydroxides, such as magnesium hydroxides, or corresponding oxides, such as magnesia may also be used.

Suitable basic-acting agents containing both an inorganic and an organic residue include salts of alkali or alkaline earth metals and a sufficiently weak organic acid so that the resultant salt is alkaline in reaction. Examples thereof include: sodium acetate, calcium propionate, potassium benzoate, sodium naphthoate, and various like metal salts of aryl- or alkyl-containing carboxylic acids. Substituents which do not remove the alkalinity of the resultant salt sufficiently to make it acidic in reaction are also suitable in these salts or in any of the compounds which may be prepared for the purposes of this invention.

Salts of strong organic bases with weak organic acids may also be used. These include quaternary ammonium salts of acids weaker than the basicity of the corresponding quaternary ammonium hydroxide, e. g., benzyltrimethylammoniumacetate, benzoate, or carbonate or benzyllauryldiethylammonium dithiocarbonate.

The above compositions comprising a source of water-soluble nitrite compound and a basic-acting agent may be utilized in any of the numerous ways already familiar to those skilled in the art. A particularly useful embodiment of the present invention is obtained when the combination of nitrite and basic-acting agent is impregnated in, coated upon, or otherwise attached to wrapping paper, cardboard, metal foil, or other packaging material. The packaging material may then be used to wrap or package metal objects in enclosed spaces, and the surfaces of the objects will be well protected from corrosion by atmospheric moisture and air.

When the invention is utilized in the form of a protective wrapping paper or other packaging material, it is generally preferred to use nitrite salts, either organic or inorganic, as the source of water-soluble nitrite compound, such salts being preferred at least partially because they are solids under normal conditions and consequently more conveniently handled. Likewise, it is preferred to use a solid basic-acting agent, and in fact such becomes almost mandatory from a practical viewpoint if more than a small proportion of basic-acting agent is utilized.

The amounts of nitrite compound and basic-acting agent which should be used in preparing the above packaging materials will vary markedly, depending upon the severity of the corrosive conditions to which the metal is to be exposed, the degree of tightness of the enclosure in which the metal object is packaged, and the length of time for which protection is required. In general, between about 0.1 and about 5 grams of the nitrite compound per square foot of the packaging material will be satisfactory for average conditions. The amount of basic-acting agent will also vary, depending upon the particular basic-acting agent and upon the particular nitrite compound involved. Usually more than about 0.4% by weight based on the mixture will be required, and as much as 50% by weight is often desirable. Under some circumstances, such as mentioned below in connection with Example XIX, even greater quantities of the basic-acting agent will often be used.

The function of the basic-acting agent is not known, but it appears to operate in several ways, all of which manifest themselves in increased protection from corrosion of metal surfaces exposed to the corrosion-inhibiting compositions containing such agents. For example, it is known that in aqueous, strongly acidid nitrous acid solutions, the primary and secondary amines either will form alcohol and nitrogen or will form N-nitroso compounds according to the well-known reactions of amines with nitrous acid. Thus, the presence of the basic-acting agents will tend to counteract any foreign acidity in the environments. Even in the absence of any acids, however, the basic-acting agents have been found to greatly improve the thermal stability of the nitrite salts, thus preserving their effectiveness over longer periods of time at elevated temperatures. Even aside from the element of acid and thermal stability, the presence of the basic-acting agents increases the effectiveness of the nitrite compounds as inhibitors. This may be partially due to an increased effectiveness of corrosion inhibition by nitrite ions in alkaline aqueous solutions; but this cannot fully account for the increased effectiveness, because basic-acting agents such as ammonium acetate, which gives a neutral aqueous solution, are excellent materials for use according to the invention herein. There is also reason to believe that the basic-acting agents, or products released therefrom, may react with the nitrite compound, or products thereof, to form a different but more effective corrosion inhibitor.

Support for each of the above theories, as well as many others, may be found in the following examples, which are presented by way of illustration of the outstanding results obtained according to the present invention. It is emphasized that the examples are merely illustrative and should not be construed as limiting the invention as set forth above or as claimed.

*Example I*

One milliliter of a 30% aqueous solution of diisopropyl-ammonium nitrite salt was pipetted into each of eight Pyrex test tubes. Diethanolamine (in an amount equal to 10% by volume of the solution) was also added to four of the above tubes. Each tube was rapidly sealed in a blast lamp flame. The sealed tubes were then maintained in a water bath at 80° C., and the respective tubes were opened at the intervals specified below. The contents of each tube were then washed out quantitatively and analyzed for nitrite anion. The following results were obtained:

| Duration, Hours | Concentration of Nitrite, expressed as Diisopropyl-ammonium Nitrite, gm./ml. | |
| --- | --- | --- |
|  | No Stabilizer | Containing 10% by Volume of Diethanolamine |
| 0 | 0.308 | 0.310 |
| 1 | 0.287 | 0.309 |
| 8 | 0.138 | 0.307 |
| 18 | 0.121 | 0.303 |

The results show that the presence of the diethanolamine effectively stabilized the nitrite salt.

*Example II*

One milliliter of a 25% aqueous solution of diisopropyl-ammonium nitrite was pipetted into each of two Pyrex test tubes. One of these tubes was made to contain diethanolamine in an amount equal to 0.1% by weight of the total solution in this tube. The tubes were then sealed off and maintained at 120° F. for 36 days. At the end of this period of time it was found that all of the nitrite salt remained undecomposed in the tube containing the free diethanolamine. On the other hand, in the control test employing no amine, about 56% of the original amine nitrite was found to have decomposed.

*Example III*

Acetone was substantially saturated with diisopropyl-ammonium nitrite salt at about 25° C., and then was refluxed in an all-glass apparatus. The temperature of the liquid was maintained at about 57° C. Samples were removed at intervals and analyzed for nitrite. It was found that, after 5 hours of refluxing, only 87% of the amine nitrite remained in the acetone solution. On the other hand, under the same conditions, a solution of the amine nitrite in acetone to which 10% diisopropylamine had been added showed no evidence of decomposition.

*Example IV*

Diisopropylammonium nitrite together with 10% of primary aliphatic amines having 16 to 18 carbon atoms was carefully weighed and introduced into a Pyrex glass tube, which was sealed and maintained at a temperature of 120° F. for 16 days. At the end of this period of time it was found that all of the nitrite salt remained undecomposed. On the other hand, a like control test on the nitrite salt, but in the absence of the amines, showed that at the end of 17 days about 22% of the nitrite salt had decomposed.

*Example V*

Pure crystals of diisopropylammonium nitrite salt were intimately mixed with diisopropyl nitrosoamine in such an amount that the resultant mixture contained 10% of the nitrosoamine. The mixture was then introduced into two tubes which were sealed carefully and rapidly so that the mixture was not heated above 120° F. The tubes were maintained at 120° F. for 26 days, at the end of which time it was found that between 86.2% and 91.0% of the nitrite salt remained undecomposed. On the other hand, a like test (but without the above stabilizer) showed that only about 78% of the nitrite salt remained undecomposed at the end of 20 days, while approximately 25% decomposed after 30 days.

*Example VI*

Diisopropylammonium nitrite and 10% by weight of sodium bicarbonate were introduced into a Pyrex test tube, sealed off while care was taken to prevent decomposition of the mixture, and then maintained at 120° F. for 65 days. At the end of this period of time it was found that 100% of the nitrite salt remained undecomposed. On the other hand, a like control test on the nitrite salt, but in the absence of the bicarbonate, showed that at the end of 57 days approximately 30% of the nitrite salt had decomposed.

*Example VII*

Three aqueous solutions, containing 1% of diisopropyl-ammonium nitrite, two of which also contained 1% piperazine and 1% diisopropylammonium bicarbonate, respectively, were refluxed at about 100° C. It was found that after 24 hours of such refluxing, 77% of the amine nitrite remained undecomposed in the solution containing the piperazine, and 86% of the amine nitrite remained in the solution containing the diisopropylammonium bicarbonate. On the other hand, in the control test in which no alkaline agent was used, only 52% of the amine nitrite remained after the same period of heating.

*Example VIII*

Three 10% aqueous solutions of diisopropylammonium nitrite were prepared, two of which also contained 10% sodium carbonate, and 10% sodium bicarbonate, respectively. These solutions were introduced into each of three test tubes containing 5 square inches of kraft paper. The tubes were then sealed off without decomposition of the contents, and maintained at 100° C. for 24 hours. At the end of this period of time it was found that 95.5% of the amine nitrite remained undecomposed in the solution containing the sodium carbonate, and 86% of the amine nitrite remained in the solution containing the sodium bicarbonate. On the other hand, in the control test, only 33.6% of the amine nitrite remained undecomposed.

*Example IX*

Three ½-inch by 2-inch flat steel strips were separately imbedded in about 2 grams of commercial grade asbestos fiber, wrapped in wax paper, placed in asphalt kraft paper envelopes and suspended in a high humidity cabinet for 100 hours at 120° F. The asbestos around one of the specimens also had mixed therewith about 10% (based upon the weight of the asbestos) of dry crystals of dicyclohexylammonium nitrite, and the asbestos around another of the specimens contained about 5% of dry crystals of dicyclohexylammonium nitrite plus 5% of dry crystals of sodium nitrite. Results were as follows:

| Inhibitor | Specimen Appearance |
| --- | --- |
| None (asbestos alone) | Several large rusted areas on both surfaces and edges, and evenly distributed rust specks. |
| 10% dicyclohexylammonium nitrate | One small rusted area on one surface. |
| 5% dicyclohexylammonium nitrite plus 5% sodium nitrite. | Only a few minute rust specks on only one surface. |

From the above, it may be seen that the combination of a water-soluble nitrite salt and a basic-acting agent gives improved corrosion inhibition.

*Example X*

Sodium bicarbonate was added to dilute aqueous solutions of diisopropylammonium nitrite. Steel specimens were placed in glass bottles containing 0.05% by weight of these nitrite solutions. The bottles were then stoppered and rotated end-over-end at 60 R. P. M. at 30° C. for 8 days. At the end of this period of time, it was found that in the bottle containing 1% (by weight of the nitrite) of sodium bicarbonate, the steel specimen lost only 0.0008 gram, and in the bottle containing 10% (by weight of the nitrite) of sodium bicarbonate, the steel specimen lost only 0.0001 gram. On the other hand, in a control test with a like solution, except for the absence of any basic-acting agent, the steel specimen lost 0.0018 gram.

*Example XI*

Diisopropylammonium nitrite and 2.8% dicyclohexylammonium bicarbonate were ground and intimately mixed in a mortar. The resultant mixture was accurately weighed into a Pyrex test tube, sealed off, and then maintained at 120° F. for 96 days. At the end of this time, it was found that 95.8% of the amine nitrite salt remained undecomposed.

*Example XII*

A solution of 4% of sodium chromate in water containing 27.4 grams of diisopropylammonium nitrite per 100 ml. of the solution was maintained at 120° F. in a glass-stoppered bottle for 521 hours. At the end of this period of time, 100% of the initial weight of the amine nitrite salt remained undecomposed.

*Example XIII*

Several portions of 50% aqueous solutions of diisopropylammonium nitrite containing respectively trisodium phosphate, sodium chromate, diisopropylammonium bicarbonate (as well as mixtures of these stabilizers) were prepared. The amounts of the stabilizers used ranged up to about one and one-half times the amount of the nitrite salt. Polished steel specimens were suspended in the vapor space (containing air) above the above-specified solutions contained in glass bottles. They were all maintained at 120° F. for periods of time ranging from 40 to 157 hours, at the end of which time, it was found that all of the steel specimens were clear and free from corrosion.

*Example XIV*

Sodium bicarbonate was added to aqueous solutions of diisopropylammonium nitrite used to test corrosion of brass. The bottles containing the brass specimens and the solutions were maintained at 86° F., aerated every two days, and rotated end-over-end for 14 days. One solution contained 1.0 gram of the nitrite and 0.05 gram of the bicarbonate per 50 ml. of water, while the other solution contained 20 grams of the nitrite and 1.0 gram of the bicarbonate per 50 ml. of water. The corrosion for the respective brass specimens thus treated amounted to 0.13 mils and 0.11 mils per year, respectively. In both cases, the brass specimens retained their bright metallic sheen.

*Example XV*

1.75 square inch pieces of 60 lb. kraft paper were immersed in a 2% by weight solution of dicyclohexylamine in 75% methanol-25% water solvent mixture for 10 seconds and then dried 5 minutes with warm air. (0.05 ml. of 0.01 N sulfuric acid solution added to an entire extract of such treated paper changed phenolphthalein indicator over to the acid side.) A sample of the described amine-impregnated paper was then tested in a sealed glass tube stability test wherein the paper, onto which dicyclohexylammonium nitrite was deposited, was subjected to water vapor. A tube for a control test was prepared using a sample of the untreated paper. After the testing periods indicated below, the contents of the tubes were analyzed for nitrite content.

| Duration at 150° F., in Hours | Percent of Nitrite Salt Remaining | |
|---|---|---|
| | Amine Treated Paper | Untreated Paper |
| 500 | 76.0 | 48.5 |
| 1,240 | 66.5 | 32.0 |
| 2,500 | 51.0 | 16.5 |

The present application is a continuation-in-part of the copending applications Serial No. 663,608, filed April 19, 1946, now U. S. Patent 2,643,178; Serial No. 668,015, filed May 7, 1946, now U. S. Patent 2,643,177; Serial No. 668,016, filed May 7, 1946, now abandoned; Serial No. 673,886, filed June 1, 1946, now U. S. Patent 2,630,368; and Serial No. 706,098, filed October 28, 1946, now U. S. Patent 2,643,176; which are in turn continuations-in-part of the application Serial No. 557,358, filed October 5, 1944, now abandoned. The present application is also a continuation-in-part of the copending application Serial No. 782,047, filed October 24, 1947.

The invention claimed is:

1. A method of stabilizing dicyclohexylammonium nitrite against decomposition which comprises incorporating therewith dicyclohexylamine in a minor amount greater than about 0.4 wt. percent based upon the total of said nitrite and said amine.

2. A method of stabilizing dicyclohexylammonium nitrite against decomposition which comprises incorporating therewith a basic-acting agent in a minor amount greater than about 0.4 wt. percent based upon the total of said nitrite and said agent.

3. A method of stabilizing an organic nitrogen-base nitrite salt having a vapor pressure of at least 0.00002 mm. Hg at 21° C., which comprises incorporating therewith a basic-acting agent in a minor amount greater than about 0.4 weight percent based upon the total of said nitrite salt and said agent.

4. As a composition of matter, dicyclohexylammonium nitrite containing dicyclohexylamine, said dicyclohexylamine being present in a minor but stabilizing amount greater than about 0.4 weight percent based upon the total of said nitrite and said amine.

5. As a composition of matter, diisopropylammonium nitrite containing diisopropylamine, said diisopropylamine being present in a minor but stabilizing amount greater than about 0.4 weight percent based upon the total of said nitrite and said amine.

6. As a composition of matter, a dialkylammonium nitrite salt having a vapor pressure of at least 0.00002 mm. Hg at 21° C. containing an organic nitrogenous base, said base being present in a minor but stabilizing amount greater than about 0.4 weight percent based upon the total of said nitrite salt and said base.

7. As a composition of matter, a secondary amine nitrite salt having a vapor pressure of at least 0.00002 mm. Hg at 21° C. containing an organic nitrogenous base, said base being present in a minor but stabilizing amount greater than about 0.4 weight percent based upon the total of said nitrite salt and said base.

8. As a composition of matter, an organic nitrogen-base nitrite salt having a vapor pressure of at least 0.00002 mm. Hg at 21° C., containing a basic acting agent, said agent being present in a minor but stabilizing amount greater than about 0.4 weight percent based upon the total of said nitrite salt and said agent.

9. A vapor-phase corrosion inhibiting packaging material comprising a wrapping paper having physically associated therewith an organic nitrogen-base nitrite salt having a vapor pressure of at least 0.00002 mm. Hg at 21° C. and a basic-acting agent, said agent being present in a minor but stabilizing amount greater than about 0.4 weight percent based upon the total of said nitrite salt and said agent.

10. A vapor-phase corrosion inhibiting packaging material comprising a wrapping paper having physically associated therewith an organic nitrogen-base nitrite salt having a vapor pressure of at least 0.0002 mm. Hg at 21° C. and a basic-acting agent, said agent being present in an amount greater than about 0.4 weight percent based upon the total of said nitrite salt and said agent.

11. A composition in accordance with claim 8, wherein the basic acting agent is an organic nitrogen-base salt of carbonic acid.

References Cited in the file of this patent

UNITED STATES PATENTS

| | | |
|---|---|---|
| 2,237,745 | Musgrave | Apr. 8, 1941 |
| 2,304,950 | Parker et al. | Dec. 15, 1942 |
| 2,416,734 | Boggs et al. | Mar. 4, 1947 |

OTHER REFERENCES

Page 315 of the third edition of Hackh's Chemical Dictionary, 1944.